US010991322B2

(12) United States Patent
Zhou et al.

(10) Patent No.: US 10,991,322 B2
(45) Date of Patent: Apr. 27, 2021

(54) BISTABLE DRIVING METHOD FOR ELECTROWETTING DISPLAY AND RELATED ELECTROWETTING DISPLAY

(71) Applicants: Academy of Shenzhen Guohua Optoelectronics, Guangdong (CN); Shenzhen Guohua Optoelectronics Co., Ltd., Guangdong (CN)

(72) Inventors: Guofu Zhou, Guangdong (CN); Weijie Lin, Guangdong (CN); Alexander Victor Henzen, Guangdong (CN)

(73) Assignees: Academy of Shenzhen Guohua Optoelectronics, Guangdong (CN); Shenzhen Guohua Optoelectronics Co., Ltd., Guangdong (CN)

( * ) Notice: Subject to any disclaimer, the term of this patent is extended or adjusted under 35 U.S.C. 154(b) by 0 days.

(21) Appl. No.: 16/490,962

(22) PCT Filed: Nov. 8, 2017

(86) PCT No.: PCT/CN2017/109839
§ 371 (c)(1),
(2) Date: Sep. 4, 2019

(87) PCT Pub. No.: WO2018/161628
PCT Pub. Date: Sep. 13, 2018

(65) Prior Publication Data
US 2020/0027407 A1  Jan. 23, 2020

(30) Foreign Application Priority Data

Mar. 9, 2017 (CN) .......................... 201710138110.8

(51) Int. Cl.
*G09G 3/34* (2006.01)
*G02B 26/00* (2006.01)

(52) U.S. Cl.
CPC ........... *G09G 3/348* (2013.01); *G02B 26/005* (2013.01)

(58) Field of Classification Search
CPC ... G09G 3/348; G09G 2300/06; G02B 26/005
See application file for complete search history.

(56) References Cited

U.S. PATENT DOCUMENTS 7,550,810 B2 * 6/2009 Mignard ............... B81B 3/0078
257/415
8,514,479 B2  8/2013 Bae et al.
(Continued)

FOREIGN PATENT DOCUMENTS

CN  101223475 A  7/2008
CN  101223475 B  11/2010
(Continued)

*Primary Examiner* — Ryan A Lubit
(74) *Attorney, Agent, or Firm* — Tucker Ellis LLP; Heather M. Barnes

(57) ABSTRACT

Provided is a bistable driving method for an electrowetting display, comprising: setting a non-selected voltage for one or more writing rows; switching a row voltage of the one or more writing rows from the non-selected voltage to a selected voltage; applying the digital voltage on at least one column of digital electrodes to be written; switching the row voltage of the one or more writing rows from the selected voltage to the non-selected voltage, and decreasing the digital voltage applied to the at least one column to a voltage less than the opening voltage minus the selected voltage; and applying the steps above to next one or more writing rows until an entire display screen is written.

14 Claims, 4 Drawing Sheets

(56) References Cited

U.S. PATENT DOCUMENTS

| | | | |
|---|---|---|---|
| 9,240,143 B2 | 1/2016 | Aubert et al. | |
| 9,412,314 B2 * | 8/2016 | Amundson | G02F 1/167 |
| 9,459,445 B1 * | 10/2016 | Notermans | G02B 26/005 |
| 9,589,513 B2 | 3/2017 | Aubert et al. | |
| 2009/0079689 A1 | 3/2009 | Miyata et al. | |
| 2010/0177026 A1 * | 7/2010 | Van Dijk | G09G 3/348 345/84 |
| 2011/0032276 A1 | 2/2011 | Chen et al. | |
| 2011/0187696 A1 * | 8/2011 | Slack | G09G 3/3433 345/211 |
| 2012/0086691 A1 | 4/2012 | Lieshout et al. | |
| 2012/0256898 A1 * | 10/2012 | Aubert | G09G 3/348 345/212 |
| 2012/0262774 A1 | 10/2012 | Bae et al. | |
| 2013/0106821 A1 | 5/2013 | Aubert et al. | |
| 2017/0178575 A1 | 6/2017 | Aubert et al. | |

FOREIGN PATENT DOCUMENTS

| | | |
|---|---|---|
| CN | 102725787 A | 10/2012 |
| CN | 102725787 B | 10/2012 |
| CN | 102947873 A | 2/2013 |
| CN | 102947873 B | 2/2013 |
| CN | 103262146 A | 8/2013 |
| CN | 103984088 A | 8/2014 |
| CN | 104867460 A | 8/2015 |
| CN | 106952620 A | 7/2017 |
| EP | 2494540 B1 | 8/2017 |
| JP | 4608546 B2 | 1/2011 |
| JP | 2013-509605 A | 3/2013 |
| JP | 5743340 B2 | 3/2013 |
| KR | 10-2012-0105437 A | 9/2012 |
| KR | 10-1792289 B1 | 9/2012 |
| KR | 10-2012-0117229 A | 10/2012 |
| KR | 10-2013-0036283 A | 4/2013 |
| TW | 201106077 A | 2/2011 |
| TW | 201131200 A | 9/2011 |
| TW | I547715 B | 9/2011 |
| TW | 201220276 A | 5/2012 |
| TW | I525593 B | 5/2012 |
| WO | 2007007879 A1 | 1/2007 |
| WO | 2011051413 A1 | 5/2011 |
| WO | 2011157818 A1 | 12/2011 |
| WO | 2012047097 A1 | 4/2012 |

* cited by examiner

|    | 100/100ms |      | 100/100ms |      | 100/100ms |      | 100/100ms |      |
|----|-----------|------|-----------|------|-----------|------|-----------|------|
| R1 | 0V        | S    | N         | N    | N         | N    | N         | N    |
| R2 | N         | N    | 0V        | S    | N         | N    | N         | N    |
| R3 | N         | N    | N         | N    | 0V        | S    | N         | N    |
| R4 | N         | N    | N         | N    | N         | N    | 0V        | S    |
| C1 | Doff      | Doff | Doff      | Doff | Doff      | Doff | Doff      | Don  |
| C2 | Doff      | Doff | Doff      | Doff | Doff      | Don  | Doff      | Doff |
| C3 | Doff      | Doff | Doff      | Doff | Doff      | Don  | Doff      | Doff |
| C4 | Doff      | Don  | Doff      | Doff | Doff      | Doff | Doff      | Doff |

BISTABLE DRIVING METHOD FOR ELECTROWETTING DISPLAY AND RELATED ELECTROWETTING DISPLAY

CROSS-REFERENCE TO RELATED APPLICATIONS

This application is a national phase application of International Application No. PCT/CN2017/109839, filed Nov. 8, 2017, which claims priority to CN 201710138110.8, filed Mar. 9, 2017, all of which are hereby incorporated herein by reference.

TECHNICAL FIELD

The present disclosure relates to a driving method and an electrowetting display, and more particularly, to a bistable driving method for an electrowetting display and related electrowetting display, belonging to the field of electrowetting displays.

BACKGROUND

Electrowetting displays are becoming more and more attractive due to high brightness, high contrast ratio, large viewing angle and fast switching speed. Resulting from these properties, the electrowetting displays are suitable for video application. In theory, the electrowetting displays can be grouped into transmissive type displays and reflective type displays. For a reflective electrowetting display, energy consumption can be relatively low, as backlight is not required.

An electrowetting display generally comprises a closed electrowetting unit, polar and non-polar liquids (such as water and oil) having different optical properties and contained in the unit, several electrodes (such as digital electrodes and common electrodes) for controlling the liquid contained in the unit, and a front plate and a rear reflective plate. These immiscible liquids can be displaced by applying a voltage to the electrodes. In a balance state (in which no voltage is applied to the electrodes), the polar and non-polar liquids are naturally delaminated in the closed unit, thus forming a thin film, such as an oil film. In this state, i.e., a colored state, the thin film covers a reflective area and the unit or the pixel is displayed in color or black. By applying the voltage at two ends the electrodes, the delaminated and colored state is no longer satisfactory in terms of energy, and the unit or the pixel can move the polar liquid to make the polar liquid be contacted with an electrode surface, thus pushing the oil film to a corner of the pixel. As a result, the non-polar liquid is displaced to expose a reflective or white surface below. Therefore, in this state, i.e., a white state, the unit or the pixel is displayed as white or bright. An interaction between static electricity and capillary force determines how far the non-polar liquid is displaced to a side. A detailed description of a structure of the electrowetting display refers to the Chinese patent application CN103984088A.

In other words, the electrowetting display is usually driven by applying the voltage to the electrodes, thus affecting the "wetting" of the electrode surface, i.e., a hydrophilicity of the electrode surface. A high voltage means that a large area of electrode surface is covered with water, so that the electrowetting display has a low absorbance. Until now, the electrowetting display is driven by a constant voltage applied to the digital electrodes, but the common electrodes are at ground potential. The oil film covers the electrode surface when no voltage is applied. A minimum voltage is required to open the oil film (which is partly caused by a surface tension), which is called an opening voltage. At this voltage, the surface tension is destroyed and the pixel is suddenly switched to an "opening" state. When the voltage is lowered, the pixel cannot be closed at the same voltage, but is only closed at a much lower voltage, which is called a closing voltage. This hysteresis phenomenon is usually deemed as an obstacle, and the display is operated in an area with the voltage higher than the closing voltage, displaying continuous behaviors with increased and decreased voltages. In addition, a display surface is usually designed to have a structure that reduces the surface tension to avoid this hysteresis phenomenon. Because this addressing method requires each pixel to have a separate drive electrode, an active matrix backplane is required to address a larger number of pixels. However, by making full use of this hysteresis phenomenon to drive the electrowetting display, it is possible to use only a passive matrix (thus being cheaper) structure to drive a larger array.

SUMMARY

In order to solve the problems described above, the invention takes full advantage of the hysteresis phenomenon described above for driving an electrowetting display, thus simplifying a drive circuit of the electrowetting display.

According to the invention, a bistable driving method for an electrowetting display, comprising:

S1: setting a non-selected voltage for one or more writing rows, the non-selected voltage being less than an opening voltage minus a digital voltage but greater than a closing voltage, wherein the opening voltage is a voltage for opening an oil film existing on an electrode surface, and the closing voltage is a voltage for closing the oil film existing on the electrode surface;

S2: switching a row voltage of the one or more writing rows from the non-selected voltage to a selected voltage, the selected voltage being less than the opening voltage but greater than the opening voltage minus the digital voltage;

S3: applying the digital voltage on at least one column to be written, to enable a voltage on, at least one pixel determined by the one or more writing rows and the at least one column to be written, to be greater than the opening voltage;

S4: switching the row voltage of the one or more writing rows from the selected voltage to the non-selected voltage, and decreasing the digital voltage applied on the at least one column to a voltage less than the opening voltage minus the selected voltage; and S5: applying the steps S1 to S4 to next one or more writing rows until the entire display is written.

Preferably, the bistable driving method for an electrowetting display further comprises setting the voltages of all the rows and columns to 0V before performing the bistable driving.

Preferably, the bistable driving method for an electrowetting display further comprises firstly setting a row voltage of a writing row of the electrowetting display to 0V before increasing the row voltage of the row to the selected voltage.

Preferably, the bistable driving method for an electrowetting display further comprises increasing the row voltage of all the rows of the electrowetting display to the selected voltage after the step S5.

Preferably, the bistable driving method for an electrowetting display further comprises applying a pulse to the electrowetting display after the display is stabilized at the non-selected voltage, and setting the row voltage of the electrowetting display back to the non-selected voltage after applying the pulse, wherein the pulse has a length configured to not completely close a pixel and not change a pixel state during the bistable driving.

Preferably, the pulse is applied row by row, and the row voltage of a row returns to the non-selected voltage immediately after the pulse is applied to the row.

Preferably, the pulse is applied to all rows of the electrowetting display simultaneously, and the row voltage of all the rows returns to the non-selected voltage immediately after the pulse is applied to all the rows.

Preferably, the pulse has a voltage of 0V.

Preferably, the pulse is applied to all columns of the electrowetting display simultaneously, and the digital voltage of all the columns returns to 0V immediately after the pulse is applied to all the columns.

According to another aspect of the invention, a electrowetting display comprises a plurality of common electrodes on which a row voltage of the electrowetting display is applied, and a plurality of digital electrodes on which a digital voltage of the electrowetting display is applied, wherein the row voltage is applied to an entire row of the common electrodes, and the digital voltage is applied to an entire column of the digital electrodes, and wherein the electrowetting display is controlled by the method described above.

Compared with the prior art, the invention has the following advantages.

According to the invention, the row voltage of the electrowetting display is firstly set to the non-selected voltage, and then the row voltage of the electrowetting display is set to the selected voltage when the pixel needs to be "opened". Then, the pixel that needs to be "opened" can be switched into an "opening" state by a small voltage only, while other pixels that do not need to be "opened" will not be affected. In this way, not only the "opening/closing" state of the pixel can be rapidly changed, but also the electrowetting display can be driven with a very small voltage. For the electrowetting display with these approaches, its refresh frequency is improved and its power consumption is reduced.

The bistable driving method for an electrowetting display according to the invention takes full advantage of the hysteresis effect for the electrowetting display, in which while some pixels of the electrowetting display have been set into the "opening" state, the state of these "opened" pixels will not be changed by the digital voltage subsequently applied on the digital electrodes or the removal of these digital voltages. Therefore, a high-resolution passive matrix display can be successfully driven by driving the electrowetting display using the bistable driving method according to the invention.

The bistable driving method for the electrowetting display according to the invention can be performed row by row, that is, the state of any row of pixels can be selectively controlled by accurately controlling the row voltage of the row of the electrowetting display. In this case, an ideal image can be obtained without performing any further operation on certain rows that their states does not need to be changed.

With the bistable driving method for the electrowetting display according to the invention, once the electrowetting display is full-screen written, no further operation is needed to maintain a display state of the electrowetting display, except maintaining the row voltage of the electrowetting display between the closing voltage and the opening voltage. In this way, the electrowetting display of the invention not only has enhanced stability, but also is simplified in operation.

With the bistable driving method for the electrowetting display according to the invention, the row voltage of the electrowetting display is set to the selected voltage after the electrowetting display is written in full screen, which can maximize the brightness of the pixel in the "opening" state and does not affect the brightness of the pixel in the "closing" state, thus improving the contrast of the display.

As the electrowetting display may sometimes be closed slowly if a constant voltage is applied onto the electrodes, in order to keep the pixel opened successfully, the pulse is applied on the electrodes of the electrowetting display after the display is full-screen written. The length of the pulse during bistable driving must be short enough that the pixels cannot be completely closed, and the pixel state cannot be changed.

DETAILED DESCRIPTION

For electrowetting displays of different shapes and materials, a digital voltage, a non-selected voltage and a selected voltage can be set accordingly, and in addition, an opening voltage and a closing voltage result from a unit design/layer structure. To better describe the implementation process of the invention, an example that the opening voltage of the pixel of the electrowetting display is 15 V and the closing voltage of the pixel of the electrowetting display is 9 V, is taken herein. Any other voltage values capable of opening/closing the electrowetting display can also be used for the electrowetting display of different shapes and materials. The voltage for a row of the electrowetting display is applied on the common electrodes, and the voltage for a column of the electrowetting display is applied on the digital electrodes. An actual voltage at a pixel of the electrowetting display is a joint voltage of the voltages respectively applied on the common electrodes and the digital electrodes.

Figure 1:
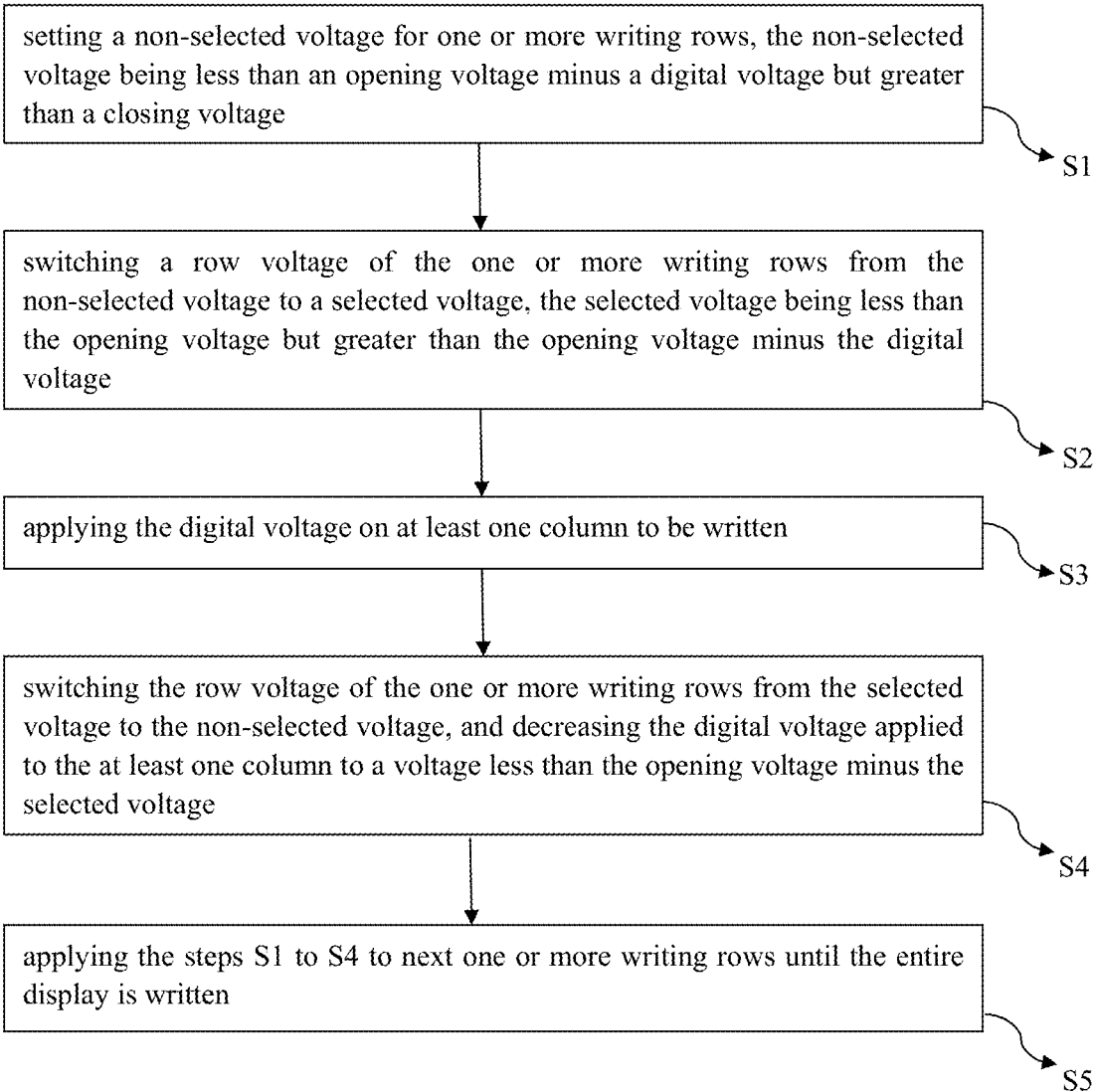
FIG. 1 is a flow chart illustrating a bistable driving method for an electrowetting display according to an embodiment of the invention.

According to an embodiment of the invention, a bistable driving method for an electrowetting display, as shown in FIG. 1, comprises the following steps.

In S1, a non-selected voltage is set for one or more writing rows, which is less than a voltage obtained by subtracting a digital voltage from an opening voltage but greater than a closing voltage, wherein the opening voltage is a voltage for opening an oil film existing on an electrode surface, and the closing voltage is a voltage for closing the oil film existing on the electrode surface. If the opening voltage is 15V and the closing voltage is 9V, the digital voltage can be any voltages within an open interval of 0V to 6V, so that the non-selected voltage is within an open interval of 9V to 15V, and a sum of the non-selected voltage and the digital voltage is still lower than 15V, so that the electrowetting display is still in a "closing" state. For example, if the digital voltage is 2V, the non-selected voltage can be set to any voltages within an open interval of 9V to 13V, such as 12V. If the digital voltage is 3V, the non-selected voltage can be set to any voltages within an open interval of 9V to 12V, such as 11V. Since the actual opening and closing voltage in the display are slightly different from predetermined voltages, it is preferable to appropriately reduce the non-selected voltage, for example, to 1V, with respect to a feasible theoretical value. For example, when the digital voltage is 2V, theoretically the non-selected voltage can be set to any voltages within the open interval of 9V to 13V, if a right boundary of a settable interval for the non-selected voltage is reduced by 1V, then the non-selected voltage can be set to any voltages within a left-open right-closed interval of 9V to 12V, such as 11 V or 12 V. Similarly, when the digital voltage is 3 V, the non-selected voltage can be set to any voltages within a left-open right-closed interval of 9V to 11V, such as 10V or 11V. Other voltages of the non-selected voltage which are appropriately reduced by about 1V are also feasible. By appropriately setting the non-selected voltage and the digital voltage described above, the electrowetting display has excellent stability, that is, it is ensured that the actual non-selected voltage plus the digital voltage does not exceed the opening voltage, so that the electrowetting display is still in the "closing" state. Preferably, the writing rows start from a first row.

In S2, a row voltage of the one or more writing rows is switched from the non-selected voltage to a selected voltage, wherein the selected voltage is less than the opening voltage but greater than the opening voltage minus the digital voltage. For example, when the digital voltage in S2 is 2V, and the non-selected voltage is 12V, the selected voltage can be set to any voltages within an open interval of 12V to 15V, such as 13.5V, 14V or 14.5V. If the digital voltage in S2 is 3V, and the non-selected voltage remains 12V, the selected voltage can be 13 V, 14 V, etc.

In S3, the digital voltage is applied on at least one column of digital electrodes to be written, so that a voltage of at least one pixel determined by the one or more writing rows and the at least one column to be written is greater than the opening voltage.

In S4, the row voltage of the one or more writing rows is switched from the selected voltage to the non-selected voltage, and the digital voltage applied on the at least one column is decreased to a voltage less than the opening voltage minus the selected voltage.

In S5, the steps S1 to S4 are repeated to next one or more writing rows until an entire display screen is written.

The digital voltage of the at least one column in S4 is reduced to 0V.

In the case of row by row controlling the "opening/closing" state of each of pixels of the electrowetting display, a number of the digital electrodes is equal to a number of the columns of the electrowetting display, that is, the "opening/closing" state of each column of pixels is controlled by a same digital electrode. For example, when a certain pixel of a writing row needs to be in the "opening" state, these digital electrodes which are in the same columns as the pixel are applied with the digital voltage respectively, and the digital electrodes, which are in the same columns as the pixels that do not need to be in the "opening" state, are kept at 0V. When the writing row is moving to the next one or more rows, the voltage applied to all digital electrodes is first set to 0V, and the "opening/closing" state of the pixel of a new writing row is controlled in the same manner as above.

Similarly, the pixels of the electrowetting display can be "closed" by simply lowering the voltage applied to the pixels to below the closing voltage, and the bistable driving method described above can be used again once the pixels are to be "opened" again.

As an alternative solution to the embodiment above, before the bistable driving is performed, the voltages of all the rows and/or the columns are set to 0V in an erasing step. After the electrowetting display is erased each time, the bistable driving method is performed until the display is written in full screen, and then the electrowetting display is erased again for the next writing.

Figure 2:
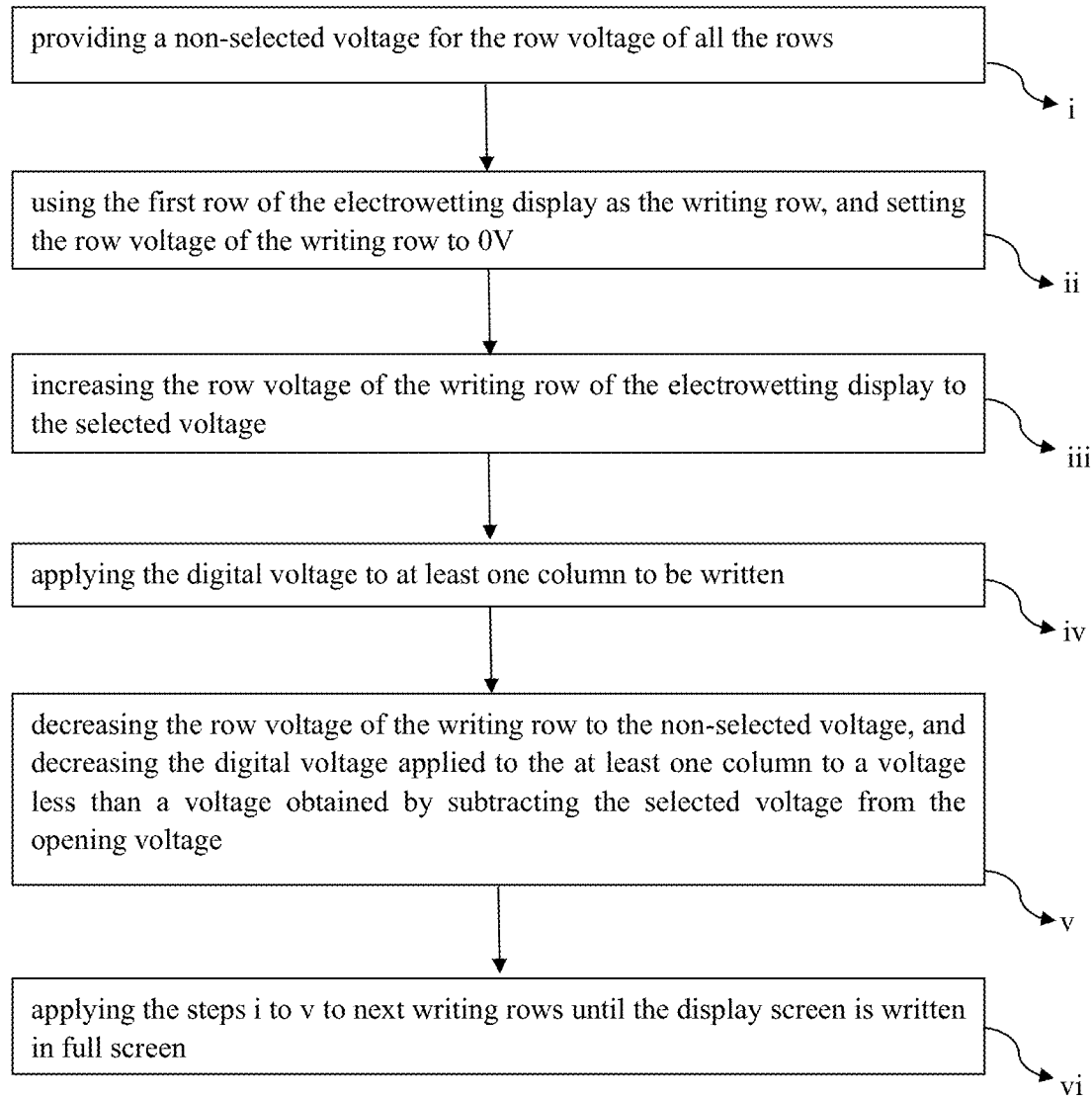
FIG. 2 is a flow chart illustrating the bistable driving method for an electrowetting display according to another embodiment of the invention.

As an alternative solution to the embodiment above, before the row voltage of the rows is increased to the selected voltage, a row voltage of a writing row of the electrowetting display is firstly set to 0V. In this case, the bistable driving method for the electrowetting display is shown in FIG. 2, comprising the following steps:

(i) providing a non-selected voltage for the row voltage of all the rows, and the non-selected voltage is less than the opening voltage minus the digital voltage but greater than the closing voltage;

(ii) using the first row of the electrowetting display as the writing row, and setting the row voltage of the writing row to 0V;

(iii) increasing the row voltage of the writing row of the electrowetting display to the selected voltage, wherein the selected voltage is less than the opening voltage but greater than the opening voltage minus the digital voltage from;

(iv) applying the digital voltage to at least one column to be written, so that a voltage of at least one pixel determined by the writing row and the at least one column to be written is greater than the opening voltage;

(v) decreasing the row voltage of the writing row to the non-selected voltage, and decreasing the digital voltage applied to the at least one column to a voltage less than a voltage obtained by subtracting the selected voltage from the opening voltage, preferably to 0V; and (vi) applying the steps i to v to next writing rows until the display screen is written in full screen.

That is, when a certain row of the electrowetting display needs to be written, the erasing step and the writing step are combined. In this way, the display does not need to be erased when writing in full screen, but the row written in a single row is erased. Therefore, its refresh frequency is improved. Similarly, the pixels of the electrowetting display can be "closed" by simply lowering the voltage applied to the pixels to below the closing voltage, and then the bistable driving method described above can be used again when the pixels needs to be "opened" again.

Figure 3:
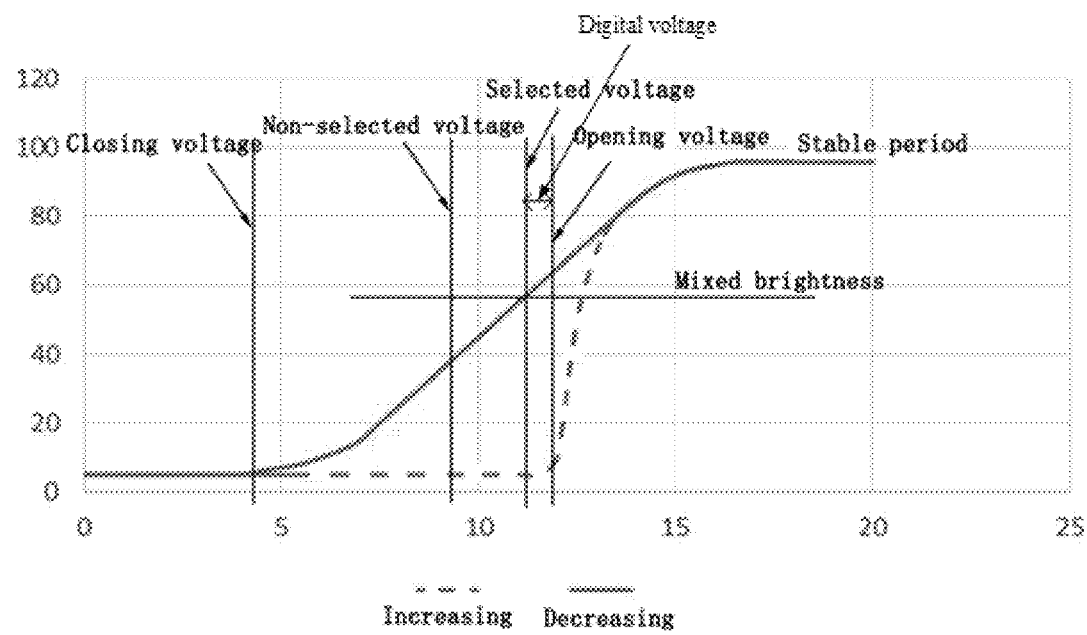
FIG. 3 is a diagram illustrating the hysteresis effect of an electrowetting display, and the brightness adjustment of an "opened" pixel according to the hysteresis effect.

As a further improvement to the embodiment described above, after the step S5, increasing the row voltage of all the rows of the electrowetting display to the selected voltage is feasible, which maximizes a brightness of the "opened" pixels of the display, as shown FIG. 3, in which a vertical axis represents the brightness. However, for the "closed" pixels of the display, since the oil film at these pixels does not move towards corners of the pixels, the brightness of these pixels will not be affected.

Figures 4, 5:
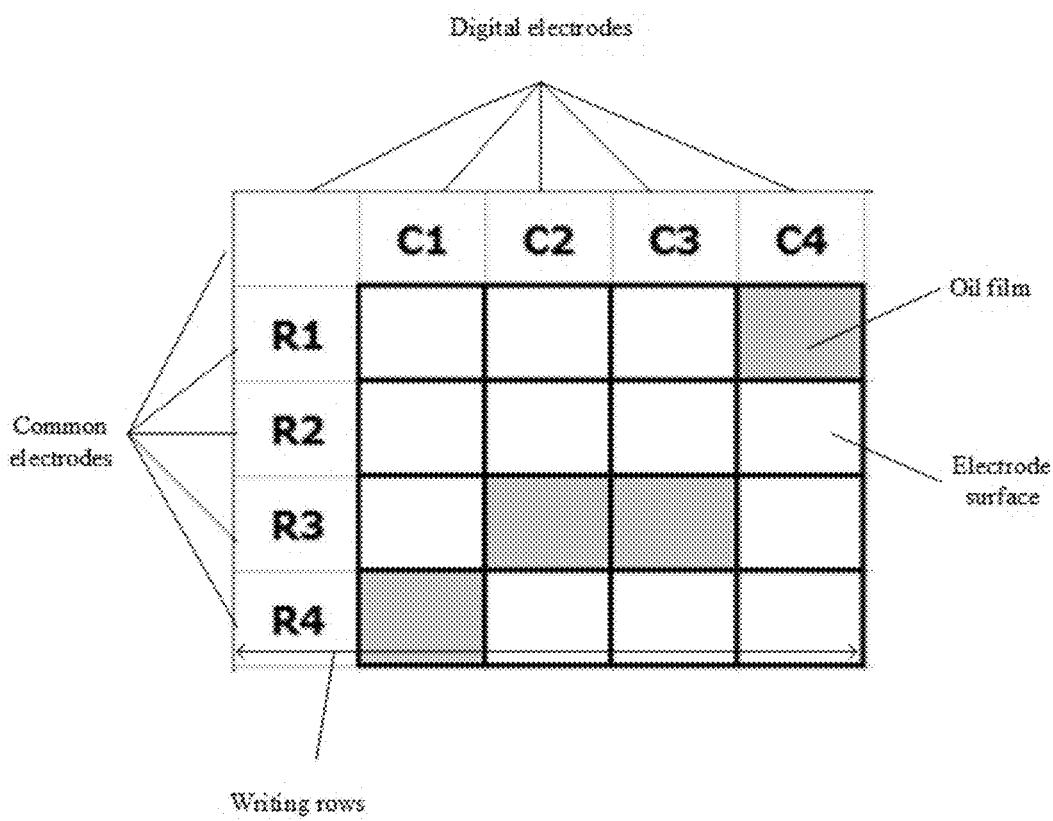
FIG. 4 illustrates a process of controlling the reset of the electrowetting display and the "opening/closing" state of the pixel according to the method of an embodiment.
FIG. 5 is a display result corresponding to FIG. 4.

In order to better describe the embodiment above, the electrowetting display comprising four rows and four columns is taken as an example, FIG. 4 illustrates a process of controlling the reset of the electrowetting display and the "opening/closing" state of the pixel according to the method of the embodiment above. Wherein, R represents rows, C represents columns, 0V represents a reset voltage, N represents the non-selected voltage, S represents the selected voltage, Doff represents the digital voltage (i.e., 0V) applied on the "closed" pixels, and Don represents the digital voltage (e.g., digital voltage, 3V) applied on the "opened" pixels. The horizontal ordinate "100/100 ms" represents that the durations of the two states of a certain pixel is 100 ms respectively. As shown in the drawing, for example, the row voltage of the first row of the electrowetting display is set to the non-selected voltage initially. To set the first pixel of the first row in the "opening" state, the row voltage of the first row is set to 0V, and the digital voltage applied to the digital electrode of the first column is kept at Doff, for 100 ms. After that, the row voltage of the first row is set to the selected voltage S, and the digital voltage applied to the digital electrode of the first column is set to Don, such that the first pixel of the first row is in the "opening" state, and this process lasts for 100 ms. Similarly, after all voltages shown in FIG. 4 are applied row by row, a display result, corresponding to FIG. 4, will be obtained, as shown in FIG. 5. In the figure, gray grids represent the pixels in the "opening" state.

Because the electrowetting display in actual implementation has a drawback that, the pixel switched into the "opening" state (i.e., the oil film is shrunk and the pixel is "clean") will gradually return to the "closing" state (even a switching voltage is continuously applied), it is usually not enough to maintain pixel switching simply by applying a continuous direct current voltage (although this case is feasible in principle).

Therefore, according to another embodiment of the present invention, after the display is full-screen written by using the bistable driving method, a pulse is applied to the electrodes of the electrowetting display, and the row voltage of the electrowetting display is set back to the non-selected voltage after the pulse is applied, wherein the pulse has a length which is short enough during the bistable driving, such that the pixel cannot be completely closed and the pixel state cannot be changed. The length of the pulse can even be as short as its visual effect is difficult to be perceived (e.g., 1 ms). The pulse can have a very low repetition frequency, e.g., once per second.

In a preferred improvement to the embodiment described above, the pulse can be applied in a following manner: after the display is addressed by using the bistable driving method, the display is stabilized at the non-selected voltage (the rows are at the non-selected voltage, and the columns are at 0V); after one second, the display is rapidly scanned at 0V (one row at a time and 1 ms for one row); and after each of the rows is addressed, the voltage of the row is immediately returned to the non-selected voltage (i.e., the 0V pulse which can be seen for 1 ms at each row).

In a preferred embodiment of the invention, the pulse can be applied in the following manner: after the display is addressed by using the bistable driving method, the display is stabilized at the non-selected voltage; and after one second, the voltages of all the rows are simply switched to 0V for 1 ms, and then immediately returned to the non-selected voltage.

In another preferred embodiment of the invention, the pulse can be applied in the following manner: after the display is addressed by using the bistable driving method, the display is stabilized at the non-selected voltage; and after one second, the voltages of all the columns are simply switched to the non-selected voltage and then immediately returned to 0V.

The voltage can be applied in various manners, to make the pulse nearly invisible. In addition, the voltage of the pulse may not have to be exactly 0V.

According to another aspect of the invention, an electrowetting display is provided, which comprises a plurality of common electrodes and a plurality of digital electrodes, a row voltage of the electrowetting display is applied to the plurality of common electrodes, and a digital voltage of the electrowetting display is applied to the plurality of digital electrodes. Specifically, the row voltage is applied to an entire row of the common electrodes, the digital voltage is applied to an entire column of the digital electrodes, and the electrowetting display is controlled by the method described above. The display of the electrowetting display can be controlled by the bistable driving method according to the implementations described in the specification. For the electrowetting display having M*N pixels, only M+N electrodes are needed for controlling the display of such an electrowetting display, this greatly simplifies the structure of electrowetting displays.

The various implementations in the disclosure are described in an exemplary way, the same and similar parts among the various implementations can be referenced to each other, and the implementations have respective focuses on different aspects. In particular, since the device embodiment is basically similar to the method embodiment, the description for the device embodiment is relatively simple, and the relevant points may refer to the partial description of the method embodiment.

The foregoing are merely the preferred implementations of the present invention, the invention should not be limited to the implementations described above, and any technical effects of the invention achieving by the same means shall fall within the protection scope of the invention. The technical solutions and/or implementations of the present invention can have various modifications and changes within the protection scope of the present disclosure. Even if individual technical features are cited in different claims, the present disclosure can also include implementations sharing these features.

Although the foregoing describes the detailed implementations of the invention with reference to the drawings, but the protection scope of the present disclosure is not limited thereto. Those skilled in the art shall understand that various modifications or variations made by those skilled in the art based on the technical solutions of the present disclosure without any creative works shall still fall within the protection scope of the present disclosure.

The invention claimed is:

1. A bistable driving method for an electrowetting display, comprising:
    S1: setting a non-selected voltage for one or more writing rows, the non-selected voltage being less than an opening voltage minus a digital voltage but greater than a closing voltage, wherein the opening voltage is applied to open an oil film existing on an electrode surface, and the closing voltage is applied to close the oil film existing on the electrode surface;
    S2: switching a row voltage of the one or more writing rows from the non-selected voltage to a selected voltage, the selected voltage being less than the opening voltage but greater than the opening voltage minus the digital voltage;
    S3: applying the digital voltage on at least one column to be written, to enable a voltage value on at least one pixel determined by the difference between the row voltage of the one or more writing rows and the digital voltage of the at least one column to be written, to be greater than a value of the opening voltage;

S4: switching the row voltage of the one or more writing rows from the selected voltage to the non-selected voltage, and decreasing the digital voltage applied on the at least one column to another digital voltage less than the opening voltage minus the selected voltage; and S5: applying the steps S1 to S4 to next one or more writing rows until the entire display is written.

2. The bistable driving method for an electrowetting display according to claim 1, further comprising setting the row voltages of all the rows and the digital voltage of all the columns to 0V before performing the bistable driving.

3. The bistable driving method for an electrowetting display according to claim 2, further comprising increasing the row voltage of all the rows of the electrowetting display to the selected voltage after the step S5.

4. The bistable driving method for an electrowetting display according to claim 2, further comprising: applying a pulse to the electrowetting display after the display being set at the non-selected voltage and becoming stable, and setting the row voltage of the electrowetting display back to the non-selected voltage after applying the pulse, wherein the pulse has a length configured to not completely close a pixel and not change a pixel state during the bistable driving.

5. The bistable driving method for an electrowetting display according to claim 4, wherein the pulse is applied row by row, and the row voltage of a row returns to the non-selected voltage immediately after the pulse is applied to the row.

6. The bistable driving method for an electrowetting display according to claim 5, wherein the pulse has a voltage of 0V.

7. The bistable driving method for an electrowetting display according to claim 4, wherein the pulse is applied to all rows of the electrowetting display simultaneously, and the row voltage of all the rows returns to the non-selected voltage immediately after the pulse is applied to all the rows.

8. The bistable driving method for an electrowetting display according to claim 7, wherein the pulse has a voltage of 0V.

9. The bistable driving method for an electrowetting display according to claim 4, wherein the pulse has a voltage of 0V.

10. The bistable driving method for an electrowetting display according to claim 4, wherein the pulse is applied to all columns of the electrowetting display simultaneously, and the digital voltage of all the columns returns to 0V immediately after the pulse is applied to all the columns.

11. The bistable driving method for an electrowetting display according to claim 1, further comprising firstly setting the row voltage of the writing row of the electrowetting display to 0V before increasing the row voltage of the row to the selected voltage.

12. The bistable driving method for an electrowetting display according to claim 11, further comprising increasing the row voltage of all the rows of the electrowetting display to the selected voltage after the step S5.

13. The bistable driving method for an electrowetting display according to claim 11, further comprising: applying a pulse to the electrowetting display after the display being set at the non-selected voltage and becoming stable, and setting the row voltage of the electrowetting display back to the non-selected voltage after applying the pulse, wherein the pulse has a length configured to not completely close a pixel and not change a pixel state during the bistable driving.

14. An electrowetting display, comprising a plurality of common electrodes on which a row voltage of the electrowetting display is applied, and a plurality of digital electrodes on which a digital voltage of the electrowetting display is applied, wherein the row voltage is applied to an entire row of the common electrodes, and the digital voltage is applied to an entire column of the digital electrodes, and wherein the electrowetting display is configured to:

S1: set a non-selected voltage for one or more writing rows, the non-selected voltage being less than an opening voltage minus a digital voltage but greater than a closing voltage, wherein the opening voltage is applied to open an oil film existing on an electrode surface, and the closing voltage is applied to close the oil film existing on the electrode surface;

S2: switch a row voltage of the one or more writing rows from the non-selected voltage to a selected voltage, the selected voltage being less than the opening voltage but greater than the opening voltage minus the digital voltage;

S3: apply the digital voltage on at least one column to be written, to enable a voltage value on at least one pixel determined by the difference between the row voltage of the one or more writing rows and the digital voltage of the at least one column to be written, to be greater than a value of the opening voltage;

S4: switch the row voltage of the one or more writing rows from the selected voltage to the non-selected voltage, and decreasing the digital voltage applied on the at least one column to another digital voltage less than the opening voltage minus the selected voltage; and S5: apply the steps S1 to S4 to next one or more writing rows until the entire display is written.

* * * * *